United States Patent
Itoh

(10) Patent No.: US 8,371,106 B2
(45) Date of Patent: Feb. 12, 2013

(54) EXHAUST GAS PURIFICATION SYSTEM OF INTERNAL COMBUSTION ENGINE

(75) Inventor: Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 696 days.

(21) Appl. No.: 12/224,341

(22) PCT Filed: Mar. 5, 2007

(86) PCT No.: PCT/JP2007/054740
§ 371 (c)(1),
(2), (4) Date: Aug. 25, 2008

(87) PCT Pub. No.: WO2007/102607
PCT Pub. Date: Sep. 13, 2007

(65) Prior Publication Data
US 2009/0007548 A1    Jan. 8, 2009

(30) Foreign Application Priority Data
Mar. 6, 2006    (JP) .................................. 2006-059837

(51) Int. Cl.
*F01N 3/00* (2006.01)
*F01N 3/10* (2006.01)
(52) U.S. Cl. .................. 60/286; 60/274; 60/276; 60/301
(58) Field of Classification Search ..................... 60/286, 60/277, 285, 287, 301; 701/101
See application file for complete search history.

(56) References Cited

U.S. PATENT DOCUMENTS

| 5,628,186 | A  | * | 5/1997  | Schmelz .......................... 60/274 |
| 5,809,774 | A  | * | 9/1998  | Peter-Hoblyn et al. .......... 60/274 |
| 6,125,629 | A  | * | 10/2000 | Patchett ........................... 60/286 |
| 6,192,676 | B1 | * | 2/2001  | Zurbig et al. .................... 60/286 |
| 6,269,633 | B1 | * | 8/2001  | van Nieuwstadt et al. ...... 60/277 |
| 6,314,722 | B1 | * | 11/2001 | Matros et al. .................... 60/274 |
| 6,823,663 | B2 | * | 11/2004 | Hammerle et al. .............. 60/286 |
| 6,826,906 | B2 | * | 12/2004 | Kakwani et al. ................. 60/303 |
| 6,882,929 | B2 | * | 4/2005  | Liang et al. .................... 701/115 |
| 6,915,629 | B2 | * | 7/2005  | Szymkowicz ................... 60/289 |
| 7,200,990 | B2 | * | 4/2007  | Gabrielsson et al. ........... 60/286 |
| 7,861,517 | B2 | * | 1/2011  | Goulette et al. ................ 60/286 |
| 7,997,070 | B2 | * | 8/2011  | Yasui et al. ..................... 60/286 |

(Continued)

FOREIGN PATENT DOCUMENTS

| CN | 1448620 A   | 10/2003 |
| JP | A-6-343877  | 12/1994 |

(Continued)

*Primary Examiner* — Kenneth Bomberg
*Assistant Examiner* — Jason Sheppard
(74) *Attorney, Agent, or Firm* — Oliff & Berridge, PLC

(57) ABSTRACT

A catalyst suited for reducing NOx in an exhaust gas by ammonia in the presence of excess oxygen is arranged in an engine exhaust passage. An aqueous urea solution is fed from a flow addition valve onto a catalyst, part of the urea fed to the catalyst is stored in the catalyst, and the ammonia generated from the urea stored in the catalyst is used to reduce the NOx in the exhaust gas. At the time of engine startup, at the time of cold operation, and at the time of increase of the HC amount, it is determined that the amount of formaldehyde in the exhaust gas flowing into the catalyst exceeds the allowable amount, and, at this time, the feed of urea to the catalyst is prohibited.

16 Claims, 2 Drawing Sheets

U.S. PATENT DOCUMENTS

| | | | |
|---|---|---|---|
| 8,061,123 B2 * | 11/2011 | Driscoll et al. | 60/286 |
| 2003/0051468 A1 * | 3/2003 | Van Nieuwstadt et al. | 60/286 |
| 2003/0182935 A1 | 10/2003 | Kawai et al. | |
| 2004/0098980 A1 * | 5/2004 | Montreuil et al. | 60/295 |
| 2006/0213187 A1 * | 9/2006 | Kupe et al. | 60/286 |
| 2007/0044457 A1 * | 3/2007 | Upadhyay et al. | 60/295 |
| 2007/0204600 A1 * | 9/2007 | Kubinski et al. | 60/286 |

FOREIGN PATENT DOCUMENTS

| | | |
|---|---|---|
| JP | B2-7-57303 | 6/1995 |
| JP | A 2001-152832 | 6/2001 |
| JP | A 2004-218475 | 8/2004 |
| JP | A 2005-201283 | 7/2005 |
| JP | B2 3685063 | 8/2005 |
| JP | A 2005-240811 | 9/2005 |

\* cited by examiner

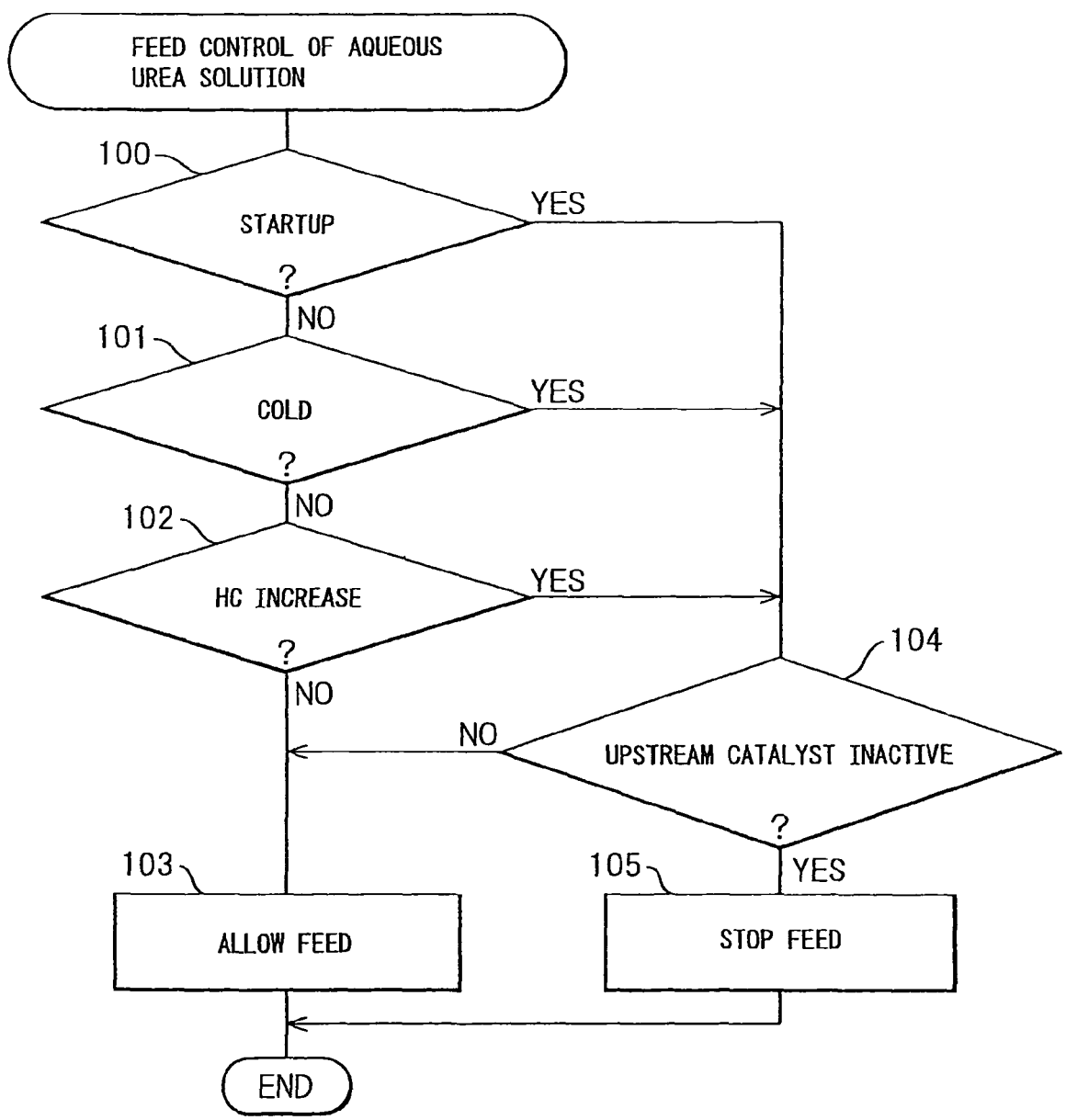

EXHAUST GAS PURIFICATION SYSTEM OF INTERNAL COMBUSTION ENGINE

TECHNICAL FIELD

The present invention relates to an exhaust gas purification system of an internal combustion engine.

BACKGROUND ART

Known in the art is an internal combustion engine arranging a catalyst suitable for reducing NOx in exhaust gas by ammonia in the presence of excess oxygen in an engine exhaust passage, feeding an aqueous urea solution to this catalyst, storing part of the urea fed to the catalyst in the catalyst, and using the ammonia generated from the urea stored in the catalyst to reduce the NOx in the exhaust gas (see Japanese Patent Publication No. 3685063).

However, the exhaust gas sometimes contains formaldehyde. When this formaldehyde reacts with the urea stored in the catalyst, urea resin is generated. Therefore, when the exhaust gas contains a large amount of formaldehyde, if feeding urea to the catalyst, not only can the urea not be effectively utilized for NOx reduction, but also a large amount of urea resin is formed on the catalyst and therefore the active sites of the catalyst are liable to be covered and the catalyst function to decrease or the catalyst to clog. If the cell pitch of the catalyst is made larger to suppress this clogging, the catalyst carried amount is liable to decrease or the contact frequency of the catalyst is liable to decrease. In any case, the exhaust purification performance of the catalyst is liable to decrease. Even if arranging in the exhaust passage upstream of the catalyst a hydrolysis catalyst for promoting hydrolysis of urea and a dispersing plate for dispersing the urea, the hydrolysis catalyst or dispersing plate is also liable to become clogged.

On the one hand, if the HC and CO in the exhaust gas and the urea or ammonia etc. react, sometimes cyanogen compounds will be generated. Therefore, when the exhaust gas contains a large amount of HC and CO, if feeding the urea to the catalyst, not only can't the urea or ammonia be effectively utilized for NOx reduction, but a large amount of cyanogen compounds is liable to be generated.

DISCLOSURE OF THE INVENTION

Therefore, the present invention has as its object the provision of an exhaust gas purification system of an internal combustion engine which can prevent the exhaust gas purification action of a catalyst from decreasing when feeding urea to the catalyst.

According to the present invention, there is provided an exhaust gas purification system of an internal combustion engine provided with a catalyst arranged in an engine exhaust passage and suitable for reduction of NOx in exhaust gas by ammonia in the presence of excess oxygen, the catalyst having the function of storing at least part of an ammonia generating compound fed to the catalyst in the catalyst, generating ammonia from the ammonia generating compound stored in the catalyst, and using the generated ammonia to reduce NOx in the exhaust gas, a feeding means for feeding the ammonia generating compound to the catalyst, a feed controlling means for controlling a feed amount of the ammonia generating compound, and a determining means for determining whether or not an amount of an exhaust purification inhibitor, inhibiting an exhaust purification action by reacting with the ammonia generating compound or a substance derived from the same, flowing into the catalyst is greater than an allowable amount, the feed controlling means decreasing an amount of the ammonia generating compound fed to the catalyst when the amount of exhaust gas purification inhibitor in the exhaust gas flowing into the catalyst is greater than the allowable amount.

BRIEF DESCRIPTION OF THE DRAWINGS

FIG. 1 is an overview of an internal combustion engine, while

FIG. 2 is a flowchart of a feed control routine of an aqueous urea solution.

BEST MODE FOR CARRYING OUT THE INVENTION

Figure 1:
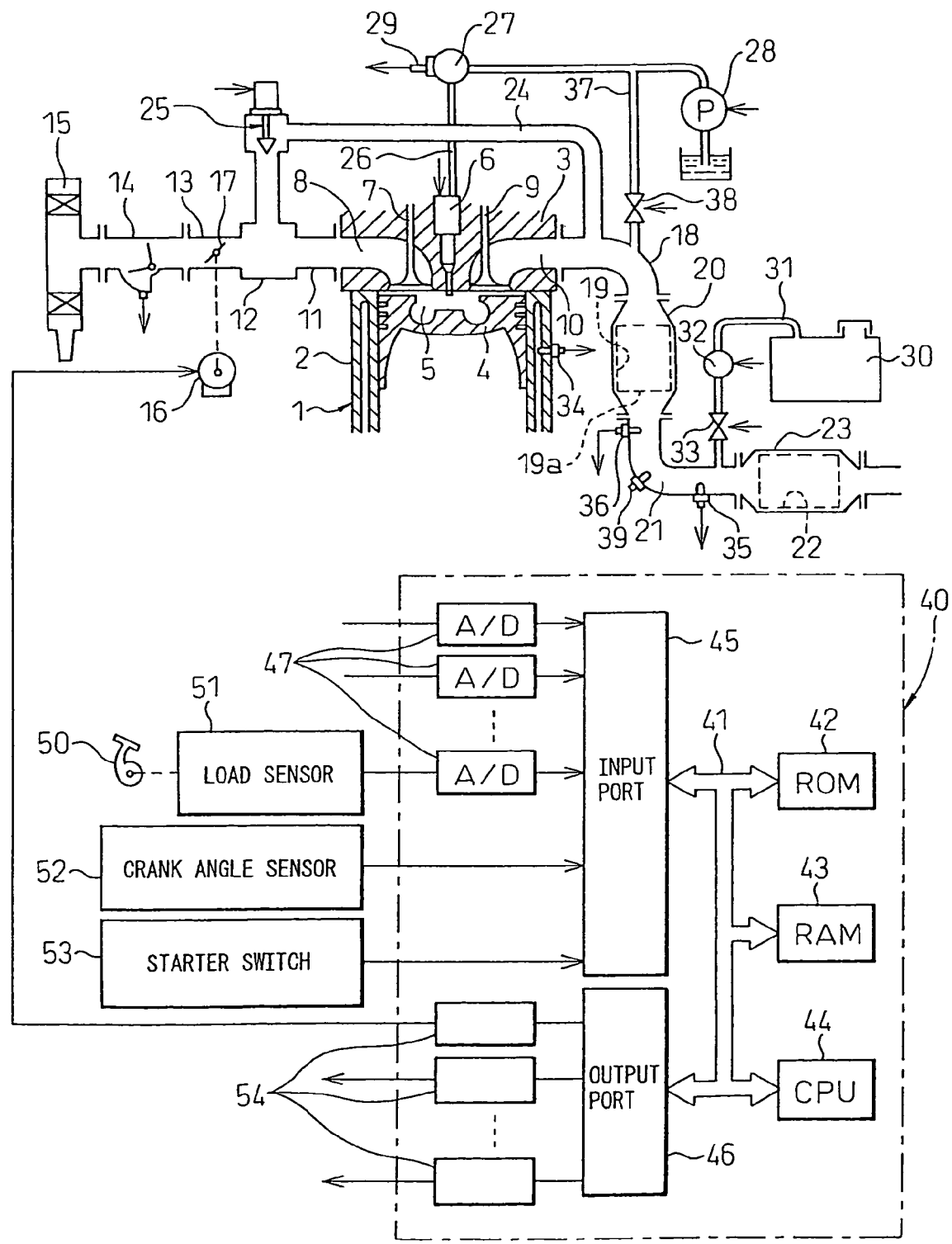

FIG. 1 shows the case of application of the present invention to a compression ignition type internal combustion engine. Note that the present invention can also be applied to a gasoline engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected through an intake duct 13 and an air flow meter 14 to an air cleaner 15. Inside the intake duct 13, a throttle valve 17 driven by a step motor 16 is arranged.

On the other hand, the exhaust port 10 is connected to an inlet of a first catalytic converter 20 housing the catalyst 19 through an exhaust manifold 18, while the outlet of the first catalytic converter 20 is connected through an exhaust pipe 21 to a second catalytic converter 23 housing the catalyst 22. In the embodiment shown in FIG. 1, the catalyst 19 is comprised of a catalyst having an oxidation function, for example, an oxidation catalyst or a three-way catalyst. This is carried on a particulate filter 19a in order to collect particulate in the exhaust gas. As opposed to this, the catalyst 22 is comprised of an NOx selective reduction catalyst suitable to reduce the NOx in exhaust gas by ammonia in the presence of excess oxygen.

The exhaust manifold 18 and the surge tank 12 are connected to each other through an exhaust gas recirculation (hereinafter referred to as an "EGR") passage 24. Inside the EGR passage 24, an electrically controlled EGR control valve 25 is arranged. The fuel injectors 6 are connected to a fuel reservoir, that is, a so-called common rail 27, through fuel feed pipes 26. The common rail 27 is fed with fuel from an electrically controlled variable discharge fuel pump 28. The fuel fed into the common rail 27 is fed through the fuel feed pipes 26 to the fuel injectors 6. The common rail 27 has a fuel pressure sensor 29 attached to it in order to detect the fuel pressure in the common rail 27. The discharge of the fuel pump 28 is controlled based on the output signal of the fuel pressure sensor 29 so that the fuel pressure in the common rail 27 becomes the target fuel pressure.

On the other hand, a liquid containing an ammonia generating compound which generates ammonia is stored in a tank 30. The liquid containing the ammonia generating compound stored in the tank 30 is fed into the exhaust pipe 21 through a feed conduit 31, a feed pump 32, and an electromagnetically controlled flow control valve 33.

Furthermore, the exhaust manifold 18 is fed with fuel, that is, the hydrocarbons HC, discharged from the fuel pump 28, through a feed conduit 37 branching from the fuel feed pipes 26 and an electromagnetically controlled HC addition valve 38.

The electronic control unit 40 is comprised of a digital computer provided with a ROM (read only memory) 42, RAM (random access memory) 43, CPU (microprocessor) 44, input port 45, and an output port 46 connected to each other by a bidirectional bus 41. The air flow meter 14 generates an output voltage proportional to the amount of intake air. This output voltage is input through a corresponding AD converter 47 to the input port 45. Further, the output signal of the fuel pressure sensor 29 is input through a corresponding AD converter 47 to the input port 45. On the other hand, the engine body 1 has attached to it a water temperature sensor 34 to detect the engine coolant water temperature, the exhaust pipe 21 directly upstream of the catalyst 22 has arranged in it a temperature sensor 35 to detect the temperature of the exhaust gas flowing onto the catalyst 22, and the exhaust pipe 21 directly downstream of the catalyst 19 has arranged in it a temperature sensor 36 to detect the temperature of the exhaust gas flowing out from the catalyst 19. The output signals of these water temperature sensor 34 and temperature sensors 35 and 36 are respectively input through corresponding AD converters 47 to the input port 45.

An accelerator pedal 50 has connected to it a load sensor 51 generating an output voltage proportional to the amount of depression L of the accelerator pedal 50. The output voltage of the load sensor 51 is input through a corresponding AD converter 47 to the input port 45. Further, the input port 45 has connected to it a crank angle sensor 52 generating an output pulse each time a crankshaft rotates by for example, 30°. Further, the input port 45 receives as input an actuation signal of a starter switch 53. On the other hand, an output port 46 is connected through the corresponding drive circuits 54 to the fuel injectors 6, step motor 16, EGR control valve 25, fuel pump 28, pump 32, the flow control valve 33, and the HC addition valve 38.

Further, as explained above, the exhaust pipe 21 upstream of the catalyst 22 is fed a liquid containing an ammonia generating compound. Regarding the ammonia generating compound able to generate ammonia, there are various compounds. Therefore, various compounds can be used as the ammonia generating compound. In the embodiment according to the present invention, urea is used as the ammonia generating compound, and as the liquid containing the ammonia generating compound, an aqueous urea solution is used. Therefore, below, the present invention will be explained taking as an example the case of feeding an aqueous urea solution into the exhaust pipe 21 upstream of the catalyst 22.

On the other hand, as explained above, the catalyst 22 is comprised of an NOx selective reduction catalyst. In the embodiment shown in FIG. 1, as this NOx selective reduction catalyst, a catalyst $V_2O_5/TiO_2$ using titania as the carrier and carrying vanadium oxide on this carrier (hereinafter referred to as a "vanadium titania catalyst") or a catalyst Cu/ZSM5 using zeolite as the carrier and carrying copper on this carrier (hereinafter referred to as a "copper zeolite catalyst") is used.

If feeding the aqueous urea solution into exhaust gas containing an excess of oxygen, the NO contained in the exhaust gas is reduced by the ammonia $NH_3$ generated from the urea $CO(NH_2)_2$ on the catalyst 22 (for example, $2NH_3+2NO+\frac{1}{2}O_2 \rightarrow 2N_2+3H_2O$).

Namely, the urea in the fed aqueous urea solution first deposits on the catalyst 22. At this time, if the temperature of the catalyst 22 is high, for example, substantially 350° C. or more, the urea thermally decomposes all at once and generates ammonia.

On the other hand, when the temperature of the catalyst 22 is from about 132° C. to about 350° C., the urea is stored once inside the catalyst 22, then ammonia is generated and released a little bit at a time from the urea stored inside the catalyst 22. The ammonia is generated in this case probably because the urea morphologically changes in the catalyst 22. Namely, the urea changes to biuret at about 132° C. The biuret changes to cyanuric acid at about 190° C. The cyanuric acid changes to cyanic acid or isocyanic acid at about 360° C. Alternatively, as the elapsed time becomes longer, the urea changes to biuret. The biuret changes to cyanuric acid, and the cyanuric acid changes to cyanic acid or isocyanic acid. It is thought that ammonia is generated a little bit at a time in the process of this kind of morphological change.

When the temperature of the catalyst 22 is the thermal decomposition temperature of urea, that is, about 132° C. or less, if feeding the aqueous urea solution to the catalyst 22, the urea in the aqueous urea solution will be stored in the catalyst 22. At this time, almost no ammonia is generated from the stored urea.

On the other hand, the particulates mainly comprised of solid carbon contained in the exhaust gas are trapped on the particulate filter 19a. Over time, the amount of particulates trapped on the particulate filter 19a increases. On the other hand, if holding the temperature of the particulate filter 19a at for example 600° C. or more in the presence of excess oxygen, the particulate on the particulate filter 19a will be removed by oxidation. Therefore, in the embodiment according to the present invention, when the amount of trapped particulate on the particulate filter 19a exceeds a predetermined amount, temperature control is performed for raising the temperature of the particulate filter 19a to and holding it at 600° C. or more in order to remove the particulate from the particulate filter 19a. Specifically, in the embodiment according to the present invention, in order to perform the temperature control, fuel is fed from the HC addition valve 38, and the amount of HC contained in the exhaust gas is increased. By burning the increased HC on the particulate filter 19a, the temperature of the particulate filter 19a rises.

However, as expressed at the beginning, if urea and formaldehyde (methanal) HCHO are reacted, a urea resin is generated. Therefore, when the exhaust gas contains a large amount of formaldehyde, if feeding urea, a large amount of the urea resin is liable to be formed on the catalyst 22.

Therefore, in this embodiment according to the present invention, it is determined whether or not the amount of formaldehyde in the exhaust gas flowing into the catalyst 22 is greater than the allowable amount. When it is determined if the amount of formaldehyde in the exhaust gas flowing into the catalyst 22 is greater than the allowable amount, the feed of urea to the catalyst 22 is stopped. As a result, a large amount of urea resin is prevented from being generated on the catalyst 22.

In the exhaust pipe 21 upstream of catalyst 22, a formaldehyde detecting sensor 39 may be attached to detect the amount of formaldehyde in the exhaust gas. Alternatively, a hydrocarbon (HC) detecting sensor (not shown) may be attached to detect the amount of HC in the exhaust gas. When the amount of formaldehyde or the amount of HC detected exceeds a certain value, it can be determined that the amount of formaldehyde in the exhaust gas flowing in is greater than the allowable amount.

However, at the time of engine startup, the relatively large amount of the formaldehyde derived from the engine oil deposited in for example the cylinder bores is discharged from the combustion chambers 5. Further, a relatively large amount of the unburned HC is discharged from the combustion chambers 5 at the time of cold operation where the engine coolant water temperature is lower than a certain value. Further, as stated above, the amount of HC contained in the exhaust gas is increased even more when HC is added from the HC addition valve 38.

Therefore, in this embodiment according to the present invention, at the time of engine startup, cold operation, or increase of the HC, it is determined that the amount of formaldehyde in the inflowing exhaust gas is greater than the allowable amount. At this time, the feed of urea is prohibited. Other than that, the feed of urea is allowed. Namely, for example, urea is fed to the catalyst 22 in the amount determined according to the amount of NOx flowing into the catalyst 22 and the amount of urea stored in the catalyst 22.

However, if the catalyst 19 is activated, it is possible to use this catalyst 19 to oxidize and reduce the formaldehyde flowing into the catalyst 22. Therefore, at the time of engine startup, cold operation, or an increase of HC as well, the feed of urea is allowed when the catalyst 19 is activated. Therefore, the feed of urea is prohibited at the time of engine startup, cold operation, or an increase of HC if the catalyst 19 is inactive.

FIG. 2 shows the routine for performing the feed control of the aqueous urea solution of the embodiment according to the present invention. This routine is performed by interruption at each predetermined time.

Referring to FIG. 2, first, at step 100, it is determined whether the time is the time of engine startup. When not the time of engine startup, next the routine proceeds to step 101 where it is determined whether or not the engine is operating cold. When not being operated cold, next the routine proceeds to step 102 where it is determined whether the HC in the exhaust gas flowing into the catalyst 22 is increased. When the HC is not increased, next the routine proceeds to step 103 where the feed of urea to the catalyst 22 is allowed. As opposed to this, when at the time of engine startup at step 100, when at the time of cold operation at step 101, and when the HC is not increased at step 102, next the routine proceeds to step 104 where it is determined whether the catalyst 19 is inactive. If the catalyst 19 is activated, the routine proceeds to step 103 where the feed of urea to the catalyst 22 is allowed. As opposed to this, when the catalyst 19 is inactive, the routine proceeds to step 105 where the feed of urea to the catalyst 22 is prohibited.

Note that it is also possible to form the catalyst 19 from an NOx storage reduction catalyst. This NOx storage reduction catalyst 19 is comprised of a precious metal catalyst and an NOx absorbent. When arranging the NOx storage reduction catalyst 19 in the exhaust passage of the internal combustion engine, if the ratio of the air and fuel (hydrocarbons) fed to the engine intake passage, combustion chambers, and exhaust passage upstream of the NOx storage catalyst is called the "air-fuel ratio of the exhaust gas", the NOx absorbent absorbs NOx when the air-fuel ratio of the exhaust gas is lean and releases the absorbed NOx when the oxygen concentration in the exhaust gas falls. This NOx is reduced by a reducing agent like HC and CO which is included in an exhaust gas.

In the internal combustion engine shown in FIG. 1, the air-fuel ratio of the exhaust gas flowing into the NOx storing reduction catalyst 19 is lean, so the NOx in the exhaust gas is absorbed in the NOx storage reduction catalyst 19. Further, if the air-fuel ratio of the exhaust gas flowing into the NOx storage reduction catalyst 19 is lean, the SOx in the exhaust gas is also absorbed in the NOx storage reduction catalyst 19. In order to prevent the NOx storage reduction catalyst 19 from being saturated by the NOx and SOx and in order to make the NOx storage reduction catalyst 19 release the NOx and SOx, HC is added from the HC addition valve 38.

Alternatively, it is also possible to form the catalyst 19 from an NOx selective reduction catalyst which can selectively reduce NOx in the presence of excess oxygen. In this case as well, HC is added from the HC addition valve 38 to reduce the NOx.

Further, HC may be added from the HC addition valve 38 to prevent the HC outlet of the HC addition valve 38 from being clogged by deposits mainly comprised of solid carbons and the HC used to blow away the deposits.

If HC is added in this way from the HC addition valve 38, the amount of the HC in the exhaust gas is increased. Therefore, it is possible to determine that the amount of formaldehyde in the exhaust gas flowing in at this time is greater than the allowable amount.

On the other hand, the amount of HC in the exhaust gas is increased when increasing the amount of the fuel injected from the fuel injectors 6 at the time of accelerated operation or when increasing the amount of fuel injected from the fuel injectors 6 to prevent the overheating of the catalysts 19 and 22. Therefore, at this time, it may be determined that the amount of formaldehyde in the inflowing exhaust gas is greater than the allowable amount.

In the embodiment according to the present invention explained above, HC is added from the HC addition valve 38 in order to add HC in the exhaust gas. However, it is also possible to feed additional fuel from fuel injectors 6 to for example the exhaust stroke after main fuel is fed in the vicinity of compression top dead center or delay the injection time of the main fuel so as to increase the amount of HC contained in the exhaust gas.

Further, in the embodiment according to the present invention explained above, when it was determined that the amount of formaldehyde in the exhaust gas flowing into the catalyst 22 is greater than the allowable amount, the feed of urea to the catalyst 22 is stopped. However, at this time, it is possible to correct the feed amount of urea to the catalyst 22 to decrease it.

Next, another embodiment according to the present invention will be explained. As explained at the beginning, if the urea or ammonia and the HC and CO react, cyanogen compounds are generated. Therefore, when large amounts of HC and CO are contained in the exhaust gas, if feeding urea, a large amount of cyanogen compounds is liable to be generated.

Therefore, in another embodiment according to the present invention, it is determined whether the HC and CO amounts in the exhaust gas flowing into the catalyst 22 are greater than the allowable amounts. When it was determined that the HC and CO amounts in the exhaust gas flowing into the catalyst 22 are greater than the allowable amounts, the feed of urea to the catalyst 22 is stopped. As a result, formation of a large amount of the cyanogen compounds is prevented.

In this case, the amount of formaldehyde in the embodiments according to the present invention described above may be considered the amounts of HC or CO.

LIST OF REFERENCE NUMERALS

1 . . . engine body
18 . . . exhaust manifold
19, 22 . . . catalyst
33 . . . flow rate control valve

The invention claimed is:
1. A method for purifying exhaust gas in an internal combustion engine, the method being carried out by an electronic control unit of the internal combustion engine, the method comprising:

feeding an amount of an ammonia generating compound to a catalyst arranged in an engine exhaust passage of the internal combustion engine via a feed controlling device, the catalyst being suitable for reduction of NOx in exhaust gas by ammonia in the presence of excess oxygen, the catalyst: i) storing at least a part of the ammonia generating compound in the catalyst, ii) generating ammonia from the ammonia generating compound stored in the catalyst, and iii) using the generated ammonia to reduce the NOx in the exhaust gas;

determining, using a formaldehyde-detecting sensor, whether an amount of formaldehyde in the exhaust gas flowing into the catalyst is greater than a predetermined allowable amount, the formaldehyde inhibiting an exhaust purification action in the catalyst by reacting with the ammonia generating compound or a substance derived from the ammonia generating compound to form a urea resin; and controlling the feed controlling device to decrease the amount of the ammonia generating compound fed to the catalyst, when it is determined using the formaldehyde-detecting sensor that the amount of the formaldehyde in the exhaust gas flowing into the catalyst is greater than the predetermined allowable amount.

2. The method of claim 1, wherein the step of controlling controls the feed controlling device to shut off the feeding the amount of the ammonia generating compound to the catalyst when it is determined that the amount of the formaldehyde in the exhaust gas flowing into the catalyst is greater than the predetermined allowable amount.

3. The method of claim 1, wherein, at a time of the internal combustion engine startup, the step of determining determines whether or not the amount of the formaldehyde in the exhaust gas flowing into the catalyst is greater than the predetermined allowable amount.

4. The method of claim 1, wherein, at a time of cold operation of the internal combustion engine, the step of determining determines whether or not the amount of the formaldehyde in the exhaust gas flowing into the catalyst is greater than the predetermined allowable amount.

5. The method of claim 1, further comprising controlling a hydrocarbon increasing device arranged in the exhaust passage upstream of the catalyst or in a combustion chamber of the internal combustion engine to temporarily increase an amount of hydrocarbon contained in the exhaust gas, wherein the step of determining determines whether or not the amount of the formaldehyde in the exhaust gas flowing into the catalyst is greater than the predetermined allowable amount when the amount of hydrocarbon contained in the exhaust gas is temporarily increased by the hydrocarbon increasing device.

6. The method of claim 1, further comprising arranging another catalyst in the engine exhaust passage upstream of the catalyst.

7. The method of claim 6, wherein the step of feeding feeds the ammonia generating compound into the engine exhaust passage between the another catalyst and the catalyst.

8. The method of claim 6, wherein the another catalyst oxidizes a hydrocarbon, and the step of determining determines whether or not the amount of the formaldehyde in the exhaust gas flowing into the catalyst is greater than the predetermined allowable amount when the another catalyst is at a temperature lower than an activation temperature for the another catalyst.

9. The method of claim 6, wherein the another catalyst is carried on a particulate filter for collecting particulate in the exhaust gas.

10. The method of claim 6, wherein the another catalyst is suitable for reducing NOx in the exhaust gas by a hydrocarbon in the presence of excess oxygen.

11. The method of claim 1, wherein the feed controlling device is controlled to feed the ammonia generating compound to the catalyst in accordance with an amount of NOx flowing into the catalyst or the amount of ammonia stored in the catalyst when the amount of the formaldehyde in the exhaust gas flowing into the catalyst is not determined to be greater than the predetermined allowable amount.

12. The method of claim 1, wherein the ammonia generating compound is urea.

13. The method of claim 12, wherein the step of feeding feeds the urea in a form of an aqueous urea solution.

14. The method of claim 1, wherein the step of feeding feeds the ammonia generating compound in a form of a liquid.

15. The method of claim 1, wherein the catalyst is formed from one of a carrier comprised of titania that carries vanadium oxide, or a carrier comprised of zeolite that carries copper.

16. The method of claim 1, wherein the internal combustion engine is a compression ignition type internal combustion engine.

* * * * *